Feb. 4, 1930.   G. W. NEFF   1,745,948
DIRECTION INDICATOR
Filed March 14, 1928   3 Sheets-Sheet 1

G. W. Neff.
INVENTOR
BY Victor J. Evans
ATTORNEY

WITNESS:

Feb. 4, 1930.                G. W. NEFF                1,745,948
                          DIRECTION INDICATOR
                       Filed March 14, 1928       3 Sheets-Sheet 2
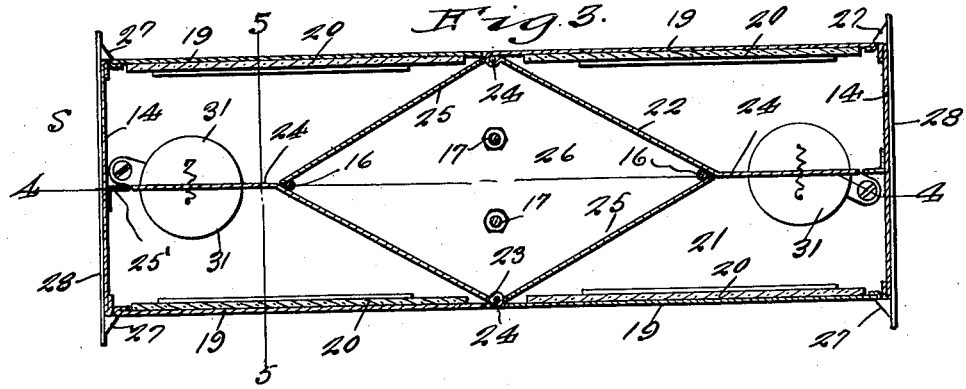
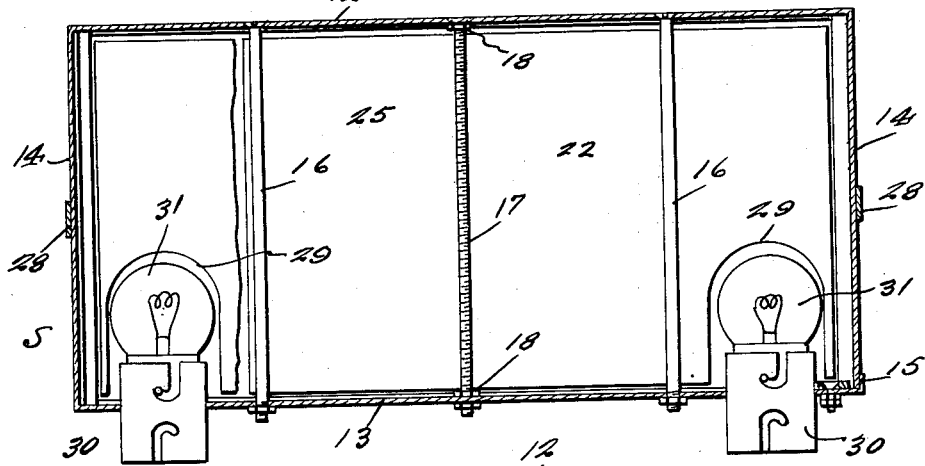
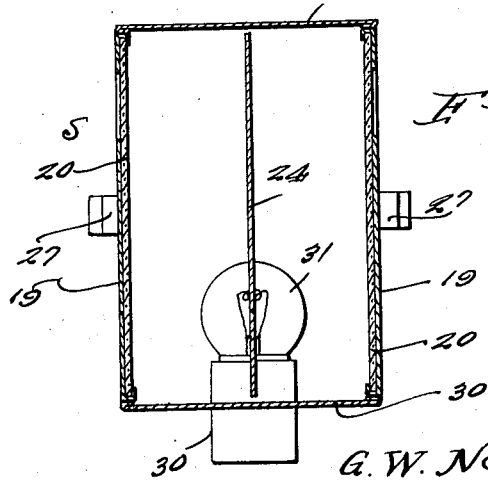
G. W. Neff  INVENTOR Feb. 4, 1930.  G. W. NEFF  1,745,948
DIRECTION INDICATOR
Filed March 14, 1928  3 Sheets-Sheet 3

G. W. Neff INVENTOR
BY Victor J. Evans
ATTORNEY

WITNESS

Patented Feb. 4, 1930

1,745,948

UNITED STATES PATENT OFFICE

GEORGE W. NEFF, OF GREENVILLE, MISSISSIPPI, ASSIGNOR OF ONE-TENTH TO JOHN W. STERLING, OF GREENVILLE, MISSISSIPPI

DIRECTION INDICATOR

Application filed March 14, 1928. Serial No. 261,531.

This invention relates to direction signals for vehicles and has especial reference to a signal casing wherein novel means are provided for dividing the casing into a number of separate compartments so as to utilize a signal lamp for illuminating more than one compartment, the construction permitting of the location of a lamp within a partition for this purpose, and providing for moving the partition with the opening of the door so that the lamp may be replaced when desired.

Another object of the invention is the provision of a door carried partition which is utilized for yieldingly holding the door against inward movement, the resilient character of the material forming the partition tending to force the door against a spring latch which normally holds the door closed.

Another object of the invention is the provision of a signal casing of novel construction in which the top, bottom and end walls are made from a single length of material, with means for holding the walls in proper shape, and means to reinforce and stiffen the walls so that the casing may be constructed of light material.

With the above and other objects in view, the invention further includes the following novel features and details of construction, to be hereinafter more fully described, illustrated in the accompanying drawings and pointed out in the appended claims.

In the drawings:—

Figure 3 is an enlarged section on the line 3—3 of Figure 2.

Figures 4 and 5 are sections taken respectively on the lines 4—4 and 5—5 of Figure 3.

Figure 1:
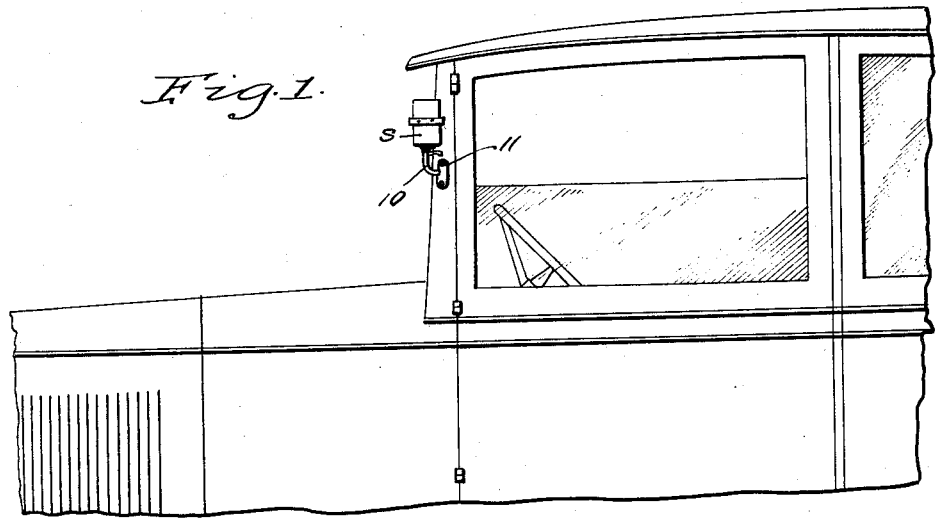
Figure 1 is an elevation showing a portion of an automobile with the signal applied.
Figure 2:
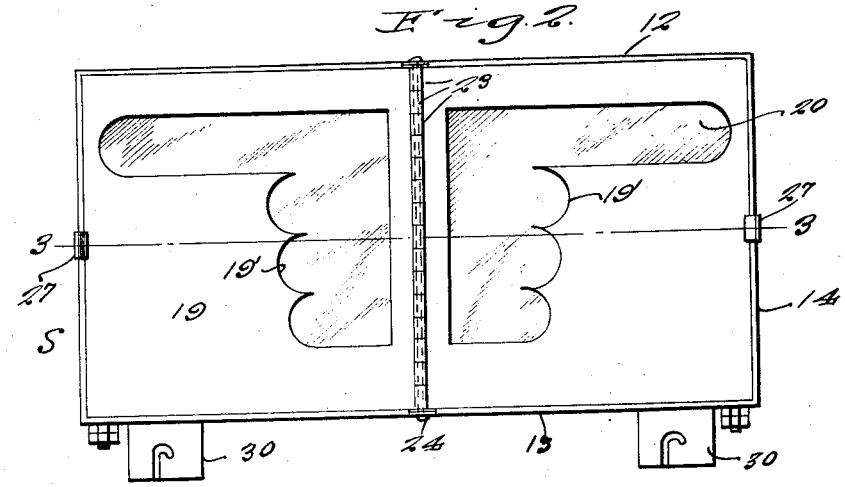
Figure 2 is an enlarged face view of the signal per se.
Figure 6:
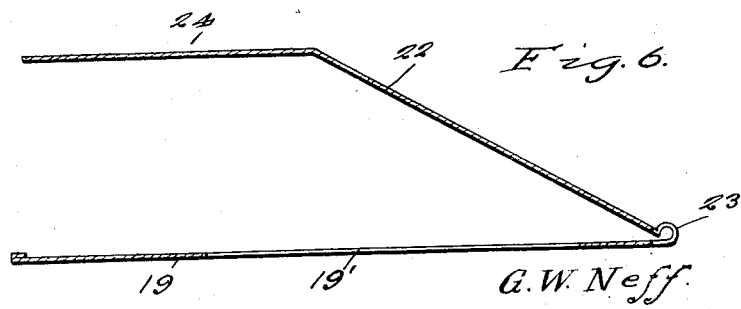

Figure 6 is a horizontal sectional view showing one of the compartment doors with its partition.

Figure 7:
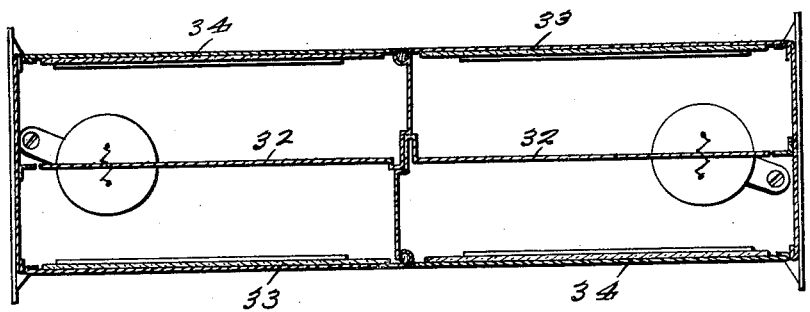

Figure 7 is a view similar to Figure 3 showing a slightly different form of the invention.

Figure 8:
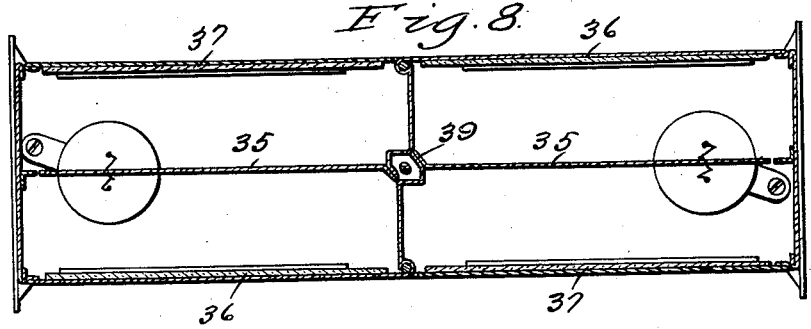

Figure 8 is a like view of still another form.

Figure 9:
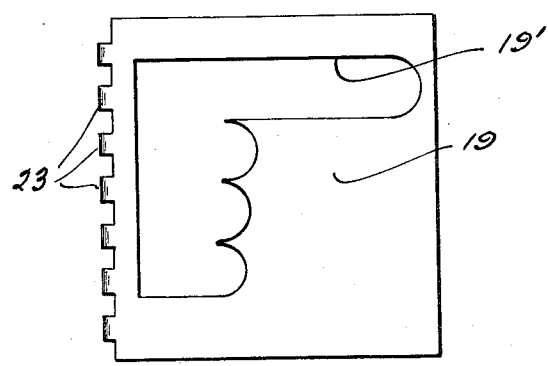

Figure 9 is an elevation of one of the doors.

Referring to the drawings in detail wherein like characters of reference denote corresponding parts, the signal which is indicated generally at S, is adapted to be mounted so as to extend from one side of a vehicle, the purpose being to permit the signal to be seen both from the front and rear ends of the vehicle. The signal may be mounted in any suitable manner such as upon a bracket arm 10 which is secured to the vehicle as shown at 11.

The signal casing includes top, bottom and end walls 12, 13 and 14 respectively. These walls may be constructed from a single length of material bent into proper shape and may have one end of one of the walls (for example the bottom wall 13) provided with a right-angled flange 15 which engages over the edge of the adjacent end walls 14. Tie bolts 16 extend through the casing and connect the top and bottom walls so as to prevent relative outward movement, while centrally located tie bolts 17 which also connect the top and bottom walls serve to prevent relative inward movement of these walls. For this purpose, the bolts 17 are provided with stop nuts 18 which engage the inner face of the top and bottom walls.

The sides of the casing are formed by doors 19 which are hingedly mounted and these doors carry suitable indicating elements which in the present instance are formed by openings 19′ provided in the doors. These openings conventionally define a hand and are covered by a glass or other transparent cover 20 which, if desired, may be red.

Two doors are provided upon opposite sides of the casing and each of these doors is adapted to close a compartment 21. To provide these compartments, the casing is divided by suitable partitions which are carried by the doors 19. For this purpose two of the doors carry partitions 22 whose shape is shown in Figure 6 of the drawings, the juncture of the partition and door being arranged to provide spaced sleeves 23, the sleeves of the doors upon one side of the casing being adapted to be positioned between one another so as to receive a hinge pin 24. The partitions 22 extend within the casing at an incline to the rods 16 and through these rods the partitions extend longitudinally and centrally of the casing as shown at 24. Angle strips 25' are located within the casing upon the inner face of the end walls and in line with the partitions so as to effectually divide or separate the compartments. The other doors carry inclined partitions 25 which extend inwardly to the rods 16, the construction shown in Figures 3, 4 and 5 providing a centrally arranged diamond-shaped compartment 26 between the compartments 21. As the partitions 24 and 25 are formed of spring metal, they will act to yieldingly limit inward movement of the doors so that the latter may be forced slightly within the compartments to be engaged by and released from spring latches 27. These latches are carried by the opposite ends of spring bars 28 secured across the end walls of the casing.

The partitions 22 are provided with openings 29 which extend inwardly from one edge and extending into the casing in line with these openings 29 are lamp sockets 30.

Lamps 31 are removably positioned within the sockets 30 and these lamps and the lamp sockets act to substantially fill the openings 29.

By arranging the housing and partitions in the manner described, the signal may be mounted so that the signal openings 19 may be seen at both the front and back of the vehicle, the partitions preventing the lights of approaching vehicles from shining through the casing so that confusion to the drivers of other vehicles is prevented. However, when the lamps 31 are illuminated, both a front and rear signal will be shown, and as the partitions 22 and 24 are carried by the doors, the lamps and lamp sockets will be uncovered when the doors are open, so that the lamps may be conveniently removed and replaced.

In Figure 7 the partitions 32 are carried by two of the doors. These doors are indicated at 33, while the doors 34 do not carry partitions. The partitions 32 are provided with openings to accommodate the lamps and lamp sockets. These partitions 32 engage at the center of the housing and are provided with a "ship lap" joint at their point of engagement so as to exclude light.

In Figure 8 the partitions 35 are carried by the doors 36, while the doors 37 like the doors 34, do not carry partitions, the difference in construction of the signal shown in Figures 6 and 7 residing principally in the construction of the partitions at the points indicated in Figure 8.

The invention is susceptible of various changes in its form, proportions and minor details of construction and the right is herein reserved to make such changes as properly fall within the scope of the appended claims.

Having described the invention what is claimed is:—

1. In a direction signal for vehicles, a casing, movable partitions dividing the casing into separate compartments, said partitions having openings along one edge, lamp sockets arranged within the casing at the outer ends of the openings, lamps removably positioned within the sockets and extending into the openings of the partitions, whereby a single lamp will illuminate more than one compartment, and hingedly mounted doors included in the casing and connected with the partitions, whereby the latter will be movably supported to permit of the removal and replacement of the lamps when the doors are open.

2. In a direction signal for vehicles, a casing, outwardly movable doors upon opposite sides of the casing, partitions carried by each of the doors and dividing the casing into separate compartments, said partitions being formed of resilient material and arranged in contacting relation to yieldingly force the doors outward, means to hold the doors in closed position, and means to illuminate the compartments.

In testimony whereof I affix my signature.

GEORGE W. NEFF.